(12) United States Patent
Kazimirov et al.

(10) Patent No.: US 6,638,073 B1
(45) Date of Patent: Oct. 28, 2003

(54) TRAINING DEVICE FOR TEACHING EMERGENCY HELP TECHNIQUES FOR A PERSON IN AN EMERGENCY SITUATION

(76) Inventors: Jury Borisovich Kazimirov, ul. Geologov 13-37, Irkutsk, 664047 (RU); Jury Alexoevich Kobakov, ul. Parlzanskaya. 101-61, Irkutsk, 664047 (RU)

( * ) Notice: Subject to any disclaimer, the term of this patent is extended or adjusted under 35 U.S.C. 154(b) by 0 days.

(21) Appl. No.: 09/509,392

(22) PCT Filed: Jul. 23, 1999

(86) PCT No.: PCT/RU99/00252
§ 371 (c)(1),
(2), (4) Date: May 1, 2000

(87) PCT Pub. No.: WO00/08619
PCT Pub. Date: Feb. 17, 2000

(30) Foreign Application Priority Data

Jul. 27, 1998 (RU) .......................................... 98114969

(51) Int. Cl.[7] .............................................. G09B 23/28
(52) U.S. Cl. ...................................... 434/272; 434/267
(58) Field of Search ................................ 434/267, 262, 434/265, 268, 270, 272; 128/920, 923; 600/300, 301; 607/4–8

(56) References Cited

U.S. PATENT DOCUMENTS

| | | | |
|---|---|---|---|
| 4,360,345 A | * | 11/1982 | Hon |
| 4,797,104 A | * | 1/1989 | Laerdal et al. |
| 4,850,876 A | * | 7/1989 | Lutaenko |
| 4,915,635 A | * | 4/1990 | Ingenito |
| 5,137,458 A | * | 8/1992 | Ungs et al. .................. 434/262 |
| 5,853,292 A | * | 12/1998 | Eggert et al. ................ 434/262 |

FOREIGN PATENT DOCUMENTS

| | | | |
|---|---|---|---|
| EP | WO92/20054 | * | 11/1992 |
| RU | 94044481 A1 | | 5/1996 |
| SU | 1636854 A1 | | 3/1991 |
| WO | WO 87/03407 | | 6/1987 |
| WO | WO 92/20054 | | 11/1992 |

OTHER PUBLICATIONS

Russian PTO Official Gazette, Jan. 1, 1999, pp. 435–436, RU 93046929/14 patent information and copy of claims 1–18.
English language Abstract of RU 93046929, Sep. 27, 1993.

* cited by examiner

*Primary Examiner*—Derris H. Banks
*Assistant Examiner*—Bena Miller
(74) *Attorney, Agent, or Firm*—Frishauf, Holtz, Goodman & Chick, P.C.

(57) ABSTRACT

The present invention relates to a training device for teaching emergency aid techniques for a person in an emergency situation, wherein said device comprises a model (1) of a human being that includes the following units connected together so as to be capable of movement: a head unit (2) provided with a device (10) for protecting students against cross-contamination: a neck unit (3); and a trunk unit (4) with upper (5) and lower (6) extremities. Said training device also includes a control system for the teaching process in the form of an anatomic display (7) that comprises video simulators for the internal organs of a human being and for traumas to said internal organs, wherein said simulators are connected to a computer (9). The model (1) further includes a set of simulators for the vital activity of the inner organs of a human being and for the traumas thereto, wherein said simulators are provided with sensors for detecting external actions applied thereon.

25 Claims, 6 Drawing Sheets

TRAINING DEVICE FOR TEACHING EMERGENCY HELP TECHNIQUES FOR A PERSON IN AN EMERGENCY SITUATION

The present invention relates to the medical field, namely to training devices for teaching emergency aid techniques for people with traumas and sudden cessation of heart operation and breathing caused by grave traumas: industrial and domestic, electric current injuries, traffic accidents, water accidents, knife and gunshot wounds, diseases, poisoning, etc.

PRECEDING LEVEL OF TECHNICAL DEVICES

At the present time, progress in the world leads invariably to an increase in situations perilous to a person's life. Analysis shows that 60% of those people who found themselves in extreme situations could have been saved by well-timed help, but usually die due to the lack of this help. However perfect first-aid may be in the present, it is still often too late in situations of grave trauma.

In instances of external hemorrhaging, and sudden cessation of blood circulation and breathing, only 3 to 5 minutes separate the reversible state of clinical death from the irreversible brain damage and damage to other vital organs typical of biological death. Therefore, one can expect real help only from people who happen to be with an injured person at the moment of the trauma and possess elementary knowledge and skills in modern emergency and traumatologic aid. This expectation demonstrated that teaching together with the usage of special training devices would be effective in giving students the necessary theoretical knowledge and the practical skills in fulfilling the concrete techniques which are necessary in saving a person's life.

For example, "The Compact interactive teaching system 40 with the model" (see U.S. Pat. No. 4,932,879), comprising a simulator for a person's thorax and a control indicating device of the proper arrangement of the reanimator's hands for carrying out an external cardiac massage, is well-known. However, it does not give us any possibility of perfect artificial respiration techniques. "The Anatomical model of a person for teaching artificial respiration techniques" is known (see Patent (Japan) No. 3-30871). This model has a movable thorax with and internal flexible pocket containing a sound-signaling device. The potentialities of said model are limited, however, as it only allows the perfection of an artificial respiration technique.

The training device for teaching artificial respiration and external cardiac massage techniques (see the Ambu advertising booklet, Denmark, 1992) comprises a model of a person with upper and lower extremities, and a control device fixed directly on the trunk of the model that is connected to a microcomputer with a raster display. The model has a thorax with a resilient surface. The head of the model includes removable nasooral masks and flexible pockets for protecting students against cross-contamination. There is also a pulse simulator fixed in the area of the carotid and radius arteries of the model and sensors for detecting the proper arrangement of the reanimator's hands as well as the thorax compression intensity in respect to the external cardiac massage. Inside the model there are flexible vessels which imitate the air filling of the "lungs" and the "stomach". With the help of an air line, said cavities join to the nasooral cavity of the head. The training device is a modern teaching equipment and it insures the control of the obligatory reanimation markers.

However, the constructional peculiarities of the model do not allow one to carry out the entire complexity of emergency help techniques. It is impossible, for instance, to realize the techniques of emergency traumatologic aid in cases of external hemorrhage, pneumothorax, fractures, etc. on the model. Furthermore, the training device does not permit a large audience to take an active part in the teaching process, which comprises observing the functioning models of a person's vital internal organs. This lack of the possibility to observe a complex picture of internal organs changing adequately in response to the actions of a student working with the model does not allow the students to understand the pathophysiological picture of a person's terminal states and makes the greatest teaching difficulties in cases of traumatic hemorrhages and pneumontorax. Moreover, the way of protecting students against cross-contamination does not rule out the emergence of infection in the model if the removable flexible pocket is torn, and also requires making a set of removable nasooral masks for such training device which takes much time if their substitution is necessary; this is detrimental to the teaching process. In addition to this, the arrangement of the teaching process controlling device on the model distorts the external anatomy and hinders students from carrying out techniques which require pressing on the epigastric stomach area. The medical teaching system (see U.S. Pat. No. 4,360,345), representing the interactive system of individual teaching, run by the computer, and comprising a model of a person, a signal memory device and information reproduction displays connected to the computer, is known. Said system ensures visual teaching and, with the help of standard methods, allows testing and directing the students through the use of computer graphics, videodisks and modeling marginal devices. Said system also trains the students in reanimation aid techniques. Using modern technology, said system sharply limits its potentialities and reduces teaching effectiveness because of the lack of possibility to train the practical techniques necessary for stopping dangerous external hemorrhages, and the emergency aid needed in cases of spine injury, penetrating knife and gunshot wounds, fractures of upper and lower extremities, etc. The potentialities of said system are further limited by demonstration on the display's screen being only outward, by the visual positions of reanimation techniques, and by the lack of demonstration of internal vital organs of an injured person changing their state adequately in response to traumatic influences and student's actions when performing reanimation techniques. The system also does not allow fully showing a student the peculiarities of the state of an injured person in the case of respiratory obstruction by liquid foreign body, and does not permit the teaching of giving emergency aid, including electric defibrillation techniques, to a person with electric trauma. Moreover, there is no guaranteed system of preventing students from cross-contamination when training artificial respiration techniques.

REVELATION OF THE PRESENT INVENTION

The goal of the present invention is to create a training device for teaching emergency help techniques for a person in an emergency situation which could increase considerably the number of current teaching programs by carrying out accordingly to the actual time scale and which could improve the quality of the teaching process by making it maximally close to real-life conditions through the construction of a model of a human being and through a control system for the teaching process connected with said model.

This goal is achieved due to the fact that the training device for teaching emergency help techniques for a person in an emergency situation comprises a model of a person including the following units connected together so as to render possible their movement: a head unit, a neck unit, a trunk unit with upper and lower extremities and also comprises a control system for the teaching process connected with the model. According to the present invention, the control system for the teaching process is performed in the form of an anatomic display that comprises video simulators for the vital internal organs of a person and their traumas, wherein said simulators are connected to a computer. The model of a human being includes a set of simulators for the vital activity of a person's inner organs with sensors for detecting external actions as well as video simulators for these organ's traumas which are also connected to a computer.

The present invention allows the carrying out of the teaching process with a high degree of reliability.

It is possible to make the head unit of the model of a human being capable of being taken apart and also to provide said model with a device for protecting students against cross-contamination in the form of a removable interchangeable unit.

Said removable interchangeable unit provides complete protection for students against cross-contamination when training artificial respiration techniques on the model of a human being and reduces considerably the time needed for processing said model with disinfecting solution.

It is possible to provide the head unit of the model of a human being with a sensor for artificial respiration comprising a magnetizing pintle, placed movably in a tube connecting the nasooral cavity with the atmosphere outside the model, on which would be affixed immovably a constant magnet. On the end of said pintle under said magnet would be affixed another constant magnet. In the walls of the base tube in an occipital region of the head unit, at least one contact controlled by a magnet should be installed; this contact must be connected to a computer and interact promptly with the constant magnet fixed on the end of said pintle.

Such construction allows modeling of spontaneous and forced breathing of a person in the model with the help of electromagnetic processes and provides a possibility to have highly effective training of artificial respiration techniques on the model and, at the same time, adequate visual control of said techniques.

The head unit of the model of a human being can be reasonably provided with a device for moving forward the lower jaw. Said device must comprise an electromagnet which is installed immovably in the head unit on the frontal panel opposite the hole drilled in the panel of the immovable part of the mask and which is connected both to a control system for the teaching process and to a constant magnet fixed stiffly on the end of a staple and interacting promptly with said electromagnet. Alternatively the head unit of the model of a human being can also be reasonably provided with a sensor for moving forward the lower jaw comprising at least one mechanical contact which is installed in the head unit on the ascending branches of the lower jaw and which is connected to a computer.

Moving forward the lower jaw makes it possible to train techniques freeing upper respiratory dusts on the model by which involve providing independent control of these actions.

It is possible to install eye simulators in the head unit of the model of a human being. Each of said eye simulators comprises a body where there are at least three light filters of different contrasts situated one under another, imitating in turn an eyeball, an iris of the eye, and a wide pupil of a person's eye. In addition, said body has one opaque light filter, imitating a narrow pupil, on the other side of which is an illuminating element connected to a computer.

Said opaque light filter allows diagnosing the state of an "injured person" by observing the geometrical size of the eyes' pupils as said pupils change in response to the reanimator's actions.

It is reasonable to provide the head unit of the model of a human being with a sensor for turning the head unit over which comprises a constant magnet fixed immovably on the upper edge of the front wall of a cylinder of the neck unit and a contact that is controlled by a magnet installed on the frontal panel of the head unit in the lower region of the chin, and that is also connected to a computer, which interacts promptly with said constant magnet.

Said sensor provides an independent control for the effectiveness of a student's actions when performing a technique of freeing upper respiratory ducts on the model of a human being by turning the head unit over.

The neck unit of the model of a human being can be made in the form of a hollow cylinder from harsh material, the surface of which imitates the external surface of a person's neck, and a foundation made in the form of the concave hemisphere. In addition, the upper edge of the back wall of the cylinder is connected movably to a lower edge of the occiput of the head unit, forming a hinge which provides the possibility of sliding the front surface of the cylinder of the neck unit about the edge of the wall of the head unit in the lower region of the chin. When the head unit is not turned over, the greater part of the cylinder of the neck unit is situated in the chamber of the head unit.

Such neck unit construction allows the modeling of a maximally reliable process of turning the head over on the model, a crucial procedure of emergency help.

It is rational to provide the neck unit of the model of a human being with a sensor for turning the neck unit, which includes a constant magnet installed stiffly on the foundation of the cylinder of the neck unit and a contact that is controlled by a magnet fixed on the trunk unit opposite said magnet and that is also connected to a computer.

Said sensor for turning the neck unit provides an independent control for the effectiveness of a student's actions when performing a technique for the removal of liquid contents from the alimentary canal and the respiratory dusts of an injured person.

The trunk unit of the model of a human being can have a tough covering wherein there is a removable unit of a chest and an abdomen comprising a common slab whereon there are two hinged tough panels joined together under which there is at least one elastically-deformed element. In addition, on said tough panels there are movably-fixed front tough panels and their surface imitates the surface of a person's chest and abdomen.

Such trunk unit construction allows the possibility to place a complete set of simulators for the vital activity of a person and sensors for detecting external actions on the trunk unit that allow the modeling of a wide spectrum of states of an injured person and the automatic controlling of all of a student's actions simultaneously with said student's influences on the model.

It is possible to provide the chest unit and abdomen unit of the trunk unit with simulators for the chest functioning and the abdomen functioning. Each of said simulators comprises a constant magnet fixed immovably on the internal side of the proper front tough panel which imitates the surface of the chest or the abdomen and under which, on a proper tough panel, there is an immovably fixed electromagnet connected to a computer that interacts promptly with said constant magnet.

The trunk unit permits the removal of flexible capacities and air lines (infection incubator) from the model and, with the help of electromagnetic processes, also the modeling of both forced excursions of the front surfaces of the chest and abdomen as well as spontaneous functioning of the chest during automatic reanimation of the model of a human being.

The removable chest and abdomen unit of the trunk unit can be provided with 1) a sensor for the external heart massage, 2) a sensor for stomach decompression and 3) a sensor for excessive effort during said external heart massage. Said sensor for the external heart massage and said sensor for stomach decompression each comprise a constant magnet fixed on the internal surface of the chest or abdomen tough panel and a contact controlled by a magnet fixed immovably on the common panel, directly under said constant magnet. Said sensor for excessive effort during the external heart massage comprises a mechanical contact installed on the common panel under the tough panels of the chest and abdomen units, and the contacts are controlled by magnets and the mechanical contact is connected to a computer.

Said sensors allow respectively 1) the automatic counting of the number of heart compressions during an external heart massage, 2) the carrying out of a technique for stomach decompression which provides an adequate amount of independent control for ensuring the effectiveness of a student's action and also 3) the recording of the degree of a student's exerting efforts during and external heart massage.

In addition, the chest and abdomen units of the trunk unit can include a set of sensors for detecting the position of a reanimator's hands on the front surface of the chest during an external heart massage comprising mechanical contacts which are installed on the internal tough panel directly under the front tough panel which are in the chest region, side endings of the ribs and the xiphoid process which are connected to a computer.

Said set of sensors allows the carrying out of an automatic control for the position of a reanimator's hands during training of the external heart massage technique on the model.

It is also possible to provide the chest and abdomen unit of the trunk unit with a sensor for the position of the model when lying on its side comprising a plate, one end of which is fixed movably on the front side of the common slab and the other end is stiffly fixed a constant magnet. On both sides of said constant magnet are two contacts which are controlled by magnets, connected to a computer and interacting in turns with said constant magnet.

Said sensor permits the carrying out of an automatic control for the position of the model when a student is performing techniques of removing liquid contents and foreign bodies from the model's respiratory ducts.

It is possible to provide the chest and abdomen units of the trunk unit with a sensor for blows to the intersapular region and a sensor for blows to the heart region. Each of said sensors comprises a body fixed in a proper place, inside which there are two constant magnets. One of said constant magnets is fixed immovably and the other is fixed so as to be capable of movement. On the external side of said body, at least one contact controlled by a magnet is installed. Said contact is connected to a computer and interacts promptly with said movable constant magnet.

Said sensor provides the possibility of training on the model of a human being the technique of freeing a foreign body from the upper respiratory ducts and the technique of recovering heart activity by mean of precardial blows of the fist to the heart region. At the same time, independent control for these actions is ensured.

It is also possible to provide the chest and abdomen units of the trunk unit with a buckle model of a waist-belt. Said model comprises a body fixed on the external side of the frontal panel that represents the surface of a person's abdomen having an insert with a light indication device and which is capable of movement. In the walls of the said body, which limit the insert's shifting, there are at least two mechanical contacts interacting promptly with said insert, and said light indicating device and said mechanical contacts are connected to a computer.

Such construction of said buckle model controls the state of the "waist-belt" which limits the shifting of the abdomen in an injured person and which also ensures the possibility of restarting the chosen emergency aid program without moving away from the model of a human being.

It is possible to provide the extremities of the model of a human being with sensors for placing immobilized splints. Each of said sensors contains at least two mechanical contacts installed under hole drilled in the covers of both the forearm and thigh region of the model. Inside each hole, a rod is installed so as to be capable of movement. Said rod interacts promptly with a proper mechanical contact and all of said holes are connected to a computer.

Said sensors allow the training of the techniques of putting immobilized splints on the model in cases of fractures to the extremities by providing an independent control for these actions.

It is possible to provide the model of a human being with pulse simulators. Each simulator contains a body wherein there is an electromagnet connected to a computer and a constant magnet. Said electromagnet and constant magnet are separated from each other by a damping gasket. The constant magnet is connected stiffly with a rod installed freely in a hole drilled in the region of the carotid and radius arteries. In the region of the humerus and thigh arteries, the pulse simulators are combined with their corresponding sensors for artery pressing. Said sensors are comprised of a common unit which has a common casing wherein there is a movable pulse simulator under which there is a mechanical contact. One part of said contact leans against the body and another part leans against the casing. The contact is connected to a computer.

Said pulse simulators ensure a highly reliable representation of forced and spontaneous heartbeats in the model of a human being in a wide range of frequency which allows training on the model in the ability to diagnose the state of an injured person by his pulse.

The model of a human being must be provided with mechanisms for stopping external hemorrhaging in the case of a penetrating wound in the head region, the extremities or the chest. Each of said mechanisms comprises a video simulator for external hemorrhaging, installed on the appropriate part of the model, which is constructed in the form of a light filter resembling a bloody spot, under which there is an illuminating element. The model should also be provided with sensors for putting an oppressive bandage or a tourniquet on a wound. Each of said sensors is combined with its corresponding simulator and comprises a mechanical contact. The model must also be provided with sensors, comprised of mechanical contacts, for pressing the correct bleeding arteries. Said sensors are installed on these arteries according to medical demands. All said video simulators and sensors are connected to a computer.

Said video simulators allow visual representation (on the model) of life-endangering external hemorrhaging as a result of penetrating wounds. Said sensors allow the carrying out of the techniques used for stopping these hemorrhages, while at the same time, ensuring an independent control for a student's actions.

It is possible to provide a control system for the teaching process in the form of an educational electric defibrillator connected to a computer. Said educational electric defibrillator includes a video simulator for the curve of electrocardiograms and removable electrodes, on the right side of each of which there is at least one contact controlled by a magnet. Each of said contacts interacts promptly with its respective constant magnet, which is installed on the internal side of the frontal panel of the chest and abdomen units in the heart region. On the level of a removable electrode, at least one mechanical contact is set in.

Said educational electric defibrillator ensures the possibility to diagnose the state of an "injured person" by curves of electrodiograms and also to recover heart activity by carrying out the technique of electric defibrillation on the model of a human being.

An anatomical display of a control system for the teaching process contains a relief panel with compartments resembling the outlines of a person's internal organs and areas of trauma to said internal organs, wherein there are illuminating elements in said compartments which are connected to a computer and to a sliding seat that is situated over said relief panel. Said anatomical display has pictures of a skeleton, internal organs, bloody spots at area of external hemorrhaging, and spine injuries. Said anatomical display is covered with a semitransparent screen directly under which, on said relief panel, there is an indicator of the time limit for the educational training program, which is also connected to a computer.

Said anatomical display models a human being's vital internal organs and their traumas not only in a static mode, but also in a dynamic one. Said internal organs change their state in response to the signs of vital activity imitated in the model of a human being and in response to a student's actions on said model. Said anatomical display also allows visual observation for ensuring the effectiveness of a student's actions in real time.

The model of a human being can be provided with a simulator for separating a person from an electrical system in the case of an electric current injury. Said simulator includes a mechanical contact and a light indicator installed over said contact, both of which are connected to a computer. On the relief panel in the anatomical display there are video simulators for the path of the electric current as it passes through the model of a human being. Said video simulators are also connected to a computer.

Said simulator allows deeper understanding of the specific features of an electrotrauma by teaching a student how to separate an injured person from contact with the current-carrying parts of electrical equipment without exposing the student to risk.

BRIEF DESCRIPTION OF THE DRAWINGS

Hereafter the present invention is elucidated upon by a description of the concrete techniques of its usage and by enclosed drawings whereon.

THE BEST WAY OF PUTTING THE INVENTION INTO EFFECT

The training device for teaching emergency aid techniques for a person in an emergency situation comprises a model 1 (FIG. 1) of a human being which can be constructed in a life-size form with such movable joints as the head 2 unit, the neck 3 unit, the trunk 4 unit with the upper 5 and lower 6 extremities. The model 1 of a human being resembles the external features of the human anatomy accessible to visual and tactile control.

Figures 1, 2:
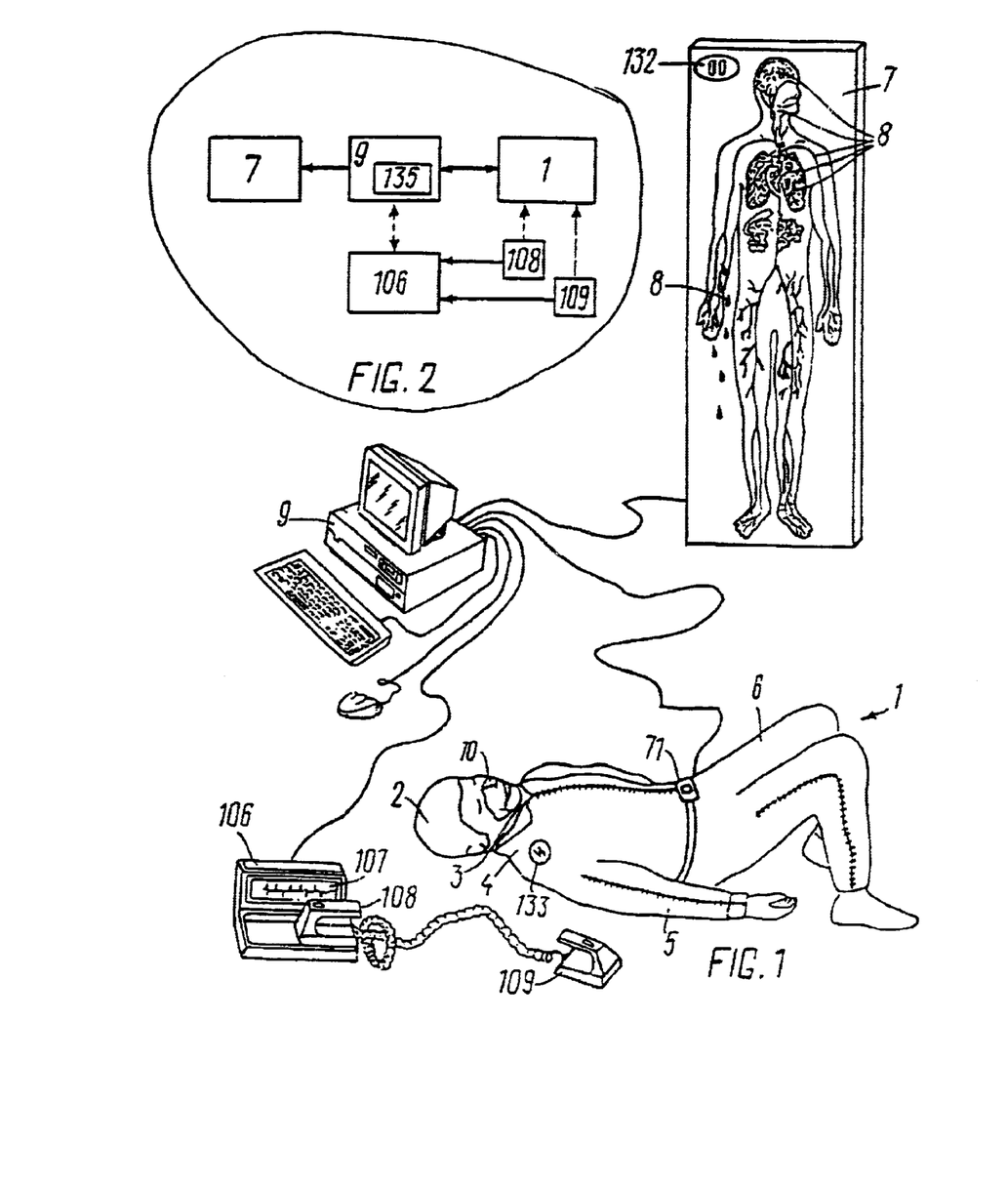
FIG. 1 depicts a general view of the training device according to the present invention.
FIG. 2 depicts a functional circuit diagram of the training device according to the present invention.

The model 1 of human being is connected to a control system for teaching emergency aid techniques which simulates the emergency situations used in educational program. Said control system carries out an independent control to ensure the effectiveness of a student's actions when practicing on the model 1 practical techniques for saving a person's life. The control system for the teaching process is constructed in the form of a anatomical display 7 which is provided with a set 8 of video simulators of the vital internal organs of a human being and of the traumas, to said human being wherein said simulators are connected to a computer 9 (FIG. 2). Inside the model 1 (FIG. 1) there are simulators for the vital activity of the inner organs of a human being with sensors for the effects of external actions on said inner organs which are also connected to a computer 9. FIG. 1 does not show the simulators and sensors installed inside the model 1 of a human being.

The head 2 unit (FIG. 3) is constructed as a hollow unit and inside it there is an interchangeable device 10 for protecting students against cross-contamination when performing on the model 1 techniques of artificial ventilation of a person's lungs.

The removable interchangeable device 10 (FIGS. 3,4) for protecting students against cross-contamination has a tough mask consisting of an immovable 11 and movable 12 parts. The immovable 11 part of the mask has a back wall 13 wherein there is a stiffly fixed tube 14. In the occipital region of the head 2 unit, there is another immovably fixed base tube 15 connected to the atmosphere outside the model. The free end of tube 14 is installed in said base tube 15 which is also connected to the atmosphere outside the model. The immovable part 11 of the tough mask simulates a human being's nose and upper lip, under which there is a convex frontal wall 16. In the convex wall 16 there is a hole 17 simulating the open mouth of a human being and directly under the hole 17 there is another hole 18. Along the edges of the convex wall 16 in the tough immovable part 11 of the mask there are guide grooves 19,20. The movable 12 part of the tough mask simulates the lower lip and chin of a human being.

Figure 4:
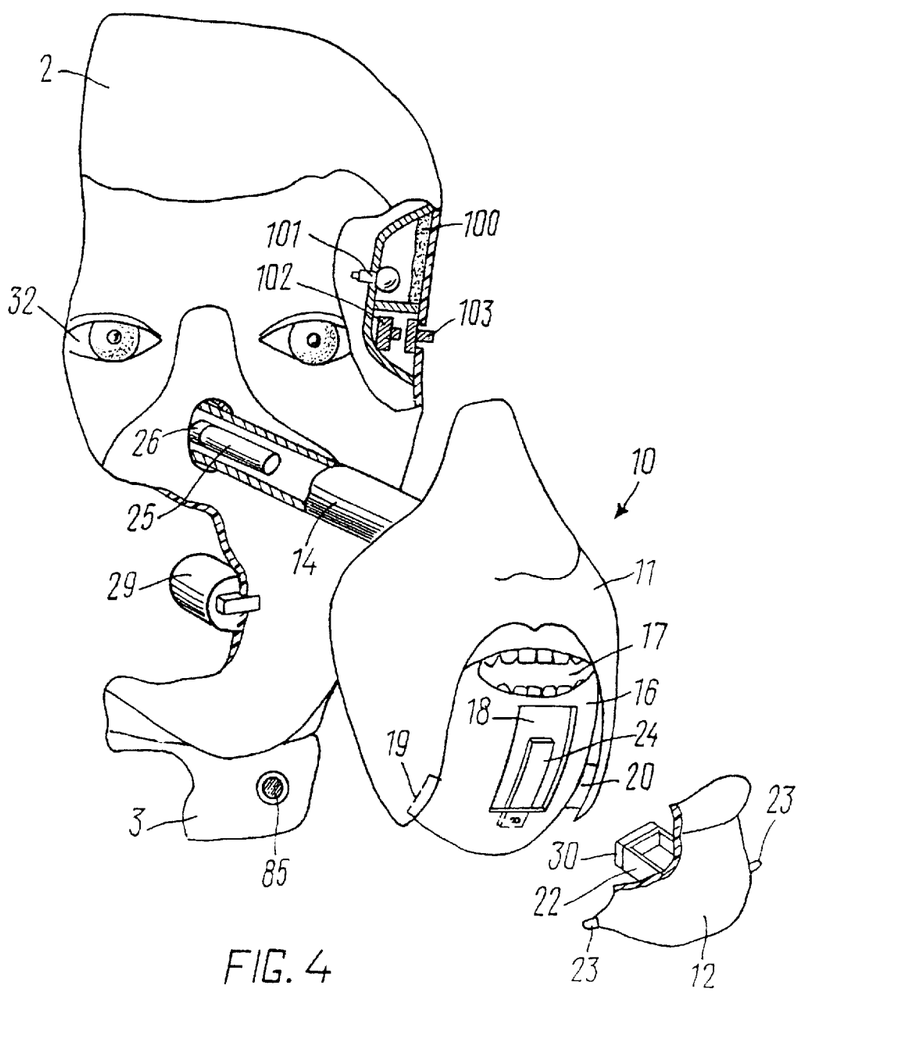
FIG. 4 depicts the head unit of the model of a human being with a pushed-forward device for protecting students against cross-contamination according to the present invention.

The internal wall 21 of the movable part 12 of the tough mask is constructed in the form of a concave hemisphere. In the center of the internal wall 21 there is a fixed clamp 22. On the edges of the internal wall 21 of the movable 12 part of the tough mask there pins 23. The diameter of these pins corresponds to the width of the grooves 19,20 situated along the edges of the convex wall 16 of the immovable part 11 of the tough mask.

Inside said clamp 22 there is a fixed plate 24 made from tough material. With the help of said plate 24 and pins 23, the movable 12 part of the mask couples freely with the immovable part 11 of the mask. The movable 12 part of the mask is capable of moving forward and sliding down along the surface of the convex hemisphere 16 of the immovable part 11 of the mask.

Figure 3:
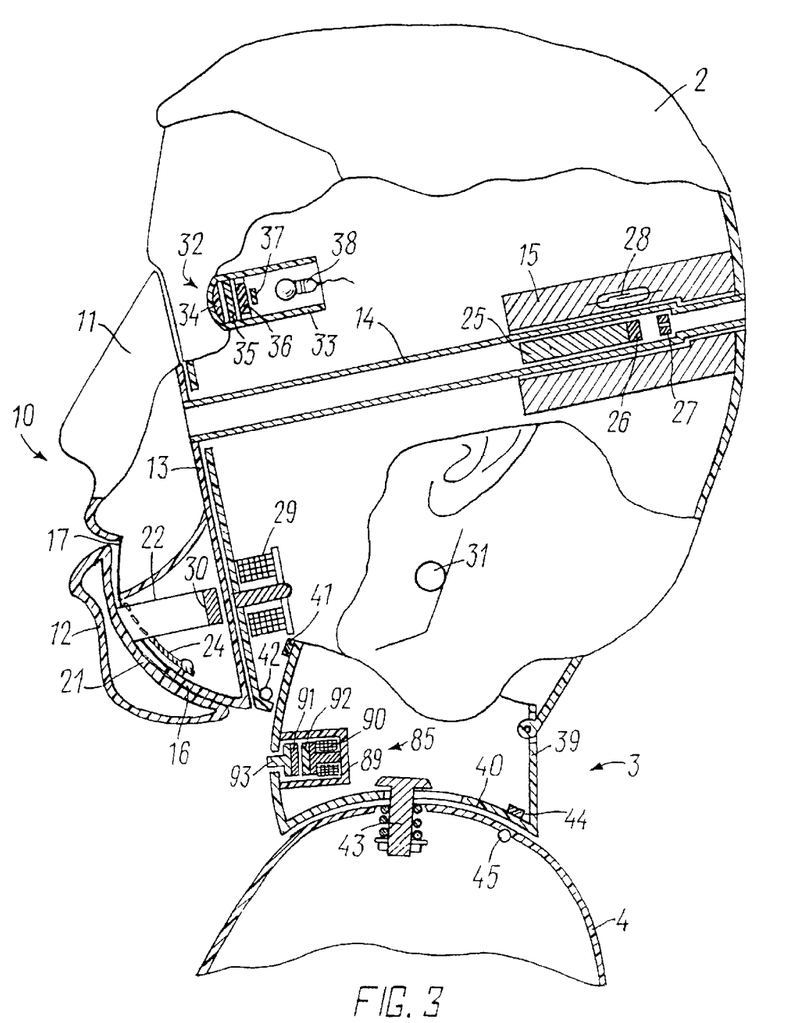
FIG. 3 represents a segmental section of the head unit of the model of a human being according to the present invention.

The head 2 unit of the model of the human being contains a pintle 25 and on one end of the pintle 25 there is a fixed magnet 26. The pintle 25 is situated freely in the tube 14 and it is magnetized by another constant magnet 27, stiffly installed under the constant magnet 26 of the pintle 25. In the wall of the base tube 15 there is a contact 28 controlled by a magnet. Contact 28 is connected to a computer 9 (FIG. 1) and interacts promptly with the constant magnet 26 (FIG. 3). In the head 2 unit of the model of a human being, the mechanism for moving the lower jaw forward comprises an electromagnet 29 (FIG. 3, 4), fixed immovably in the head 2 unit opposite the hole 18 as well as a constant magnet 30, fixed stiffly on the end of the cramp 22 and interacting promptly with the electromagnet 29. In the region of the ascending branches of the lower jaw, in the wall of the head 2 unit, there is a mechanical contact 31 of the sensor for moving the lower jaw forward. Said electromagnet 29 and mechanical contact 31 are connected to a computer 9 (FIG. 1). The head 2 unit is provided with eye simulators 32. Each of said eye simulators has a body 33, wherein there is the following set of light filters of different contrasts situated one under another: a light filter 34 simulating an eyeball, a light filter 35 simulating an iris, a light filter 36 simulating a dilated pupil of an eye and an opaque light filter 37 simulating a narrow pupil of an eye. Under each eye simulator there is an illumination element 38 connected to a computer 9 (FIG. 1).

The neck unit is made of tough plastic and represents a hollow cylinder 39. The front wall of said neck 3 unit simulates the external surface of person's neck. The foundation 40 is constructed in the form of a concave hemisphere. The upper edge of the back wall of the cylinder 39 of the neck 3 unit is combined, using a hinge, with the lower edge of the occiput of the head 2 unit. The hinge allows the frontal surface of the cylinder 39 of the neck 3 unit to slide freely along the edge of the wall of the head 2 unit when the head 2 unit is turned over. When the head 2 unit is not turned over, the greatest part of the cylinder 39 of the neck 3 unit is situated inside the head 2 unit. Thus movably combined, the head 2 unit and the neck 3 unit are provided with a sensor for turning over the head 2 unit. The sensor comprises a constant magnet 41 stiffly on the upper edge of the front wall of the cylinder 39 of the neck 3 unit and a contact 43 controlled by a magnet. The contact 43 is fixed immovably in the chin region of the head 2 unit. The contact 43, controlled by a magnet, is connected to a computer 9 (FIG. 1) and interacts promptly with a constant magnet 41.

The foundation 40 (FIG. 3) of the cylinder 39 of the neck 3 unit is installed movably on the upper part of the trunk 4 unit wherein the two are held together by a spring-opposed bolt 43. The unit of the movable conjunction between the neck 3 unit and the trunk 4 unit is provided with a sensor for turning the neck 3 unit. This sensor comprises a constant magnet 44 installed stiffly on the foundation 40 of the cylinder 39 of the neck 3 unit and a contact 45 controlled by a magnet. Contact 45 is fixed on the upper part of the trunk 4 unit opposite the constant magnet 44 and is connected to a computer 9 (FIG. 1) Said contact 45 (FIG. 3), controlled by a magnet, interacts promptly with said constant magnet 44.

Figure 5:
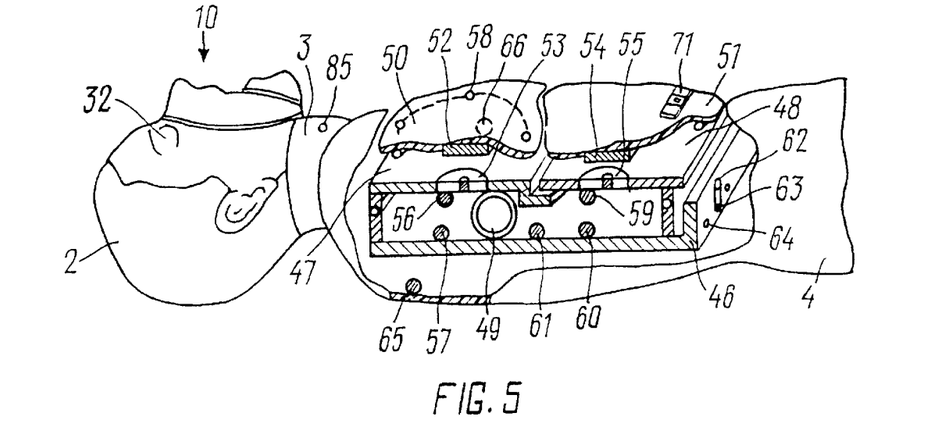
FIG. 5 depicts a longitudinal section of the trunk unit of the model of a human being according to the present invention.

In the trunk 4 (FIG. 5) unit, there is a removable chest and abdomen unit comprising a common slab 46, whereon there are two hingedly installed panels, 47 and 48, connected with each other by a hinge. Under the panels 47 and 48, there is an interchangeable resiliently deformable element 49 which simulates the chest elasticity of a human being. On the tough panels 47 and 48, there are movably fixed, respectively, a frontal tough panel 50 whose external surface resembles a relief of the front surface of a human being's chest and a frontal tough panel 15 resembling a relief of the front surface of the epigastric region of a human being's abdomen. In the removable chest and abdomen unit, there is a simulator for movement of the chest and a simulator for the movement of the abdomen. The simulator for movement of the chest comprises a constant magnet 52 (FIG. 5) fixed movably on the internal side of the front tough panel 50 resembling the surface of the chest of a human being. Under said constant magnet 52, on the corresponding tough panel 47, an electromagnet 53 is fixed immovably. The electromagnet 53 is connected to a computer 9 (FIG. 1) and interacts promptly with the constant magnet 52 (FIG. 5). The simulator for movement of the abdomen also comprises a constant magnet 54 which is fixed immovably on the internal side of the frontal tough panel 51 that simulates the surface of an abdomen of a human being. Under the constant magnet 54, on the corresponding tough panel 48, there is an immovably fixed electromagnet 55 connected to a computer 9 (FIG. 1), which interacts promptly with the constant magnet 54 (FIG. 5). The removable chest and abdomen unit is provided with a sensor for external heart massage comprising a constant magnet 56 fixed on the internal tough panel 47 in the heart region of a human being and a contact 57 controlled by a magnet. Said contact 57 is fixed immovably directly under the constant magnet 56 on the common slab 46. The contact 57, controlled by a magnet, is connected to a computer 9 (FIG. 1) and interacts promptly with said constant magnet 56 (FIG. 5). The removable chest and abdomen unit comprises a set of mechanical contacts 58 which help to control the position of a student's hands on the front surface of the chest of the trunk 4 unit when performing an external heart massage on the model 1 (FIG. 1).

Figure 6:
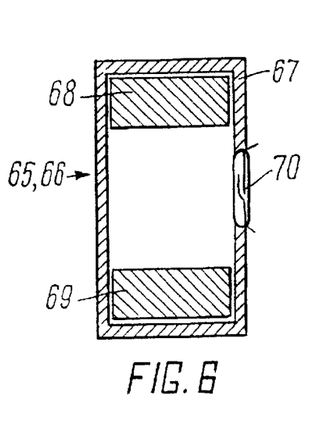
FIG. 6 represents a construction of the sensor for blows to the interscapular region and the heart region according to the present invention.

The mechanical contacts 58 (FIG. 5) are installed on the internal tough panel 47 directly under the frontal panel 50 around the "heart" and are connected to a computer 9 (FIG. 1). The removable chest and abdomen unit is also provided with a sensor for stomach decompression. Said sensor comprises a constant magnet 59 fixed on the internal tough panel 48 in the stomach region and a contact 60 controlled by a magnet. Said contact 60 is fixed immovably directly under the constant magnet 59 on the common slab 46. The contact 60, controlled by a magnet, is connected to a computer 9 (FIG. 1) and interacts promptly with said constant magnet 59 (FIG. 5). In the removable chest and abdomen unit, there is a sensor for detecting excessive effort during an external heart massage comprising a mechanical contact 61 which is fixed immovably on the common slab 46, under the tough panel 47. Said sensor is connected to a computer 9 (FIG. 1) and interacts promptly with the internal surface of said tough panel 47 (FIG. 5). In the removable chest and abdomen unit in the region of the waist, there is a sensor for positioning a model 1 of a human being (FIG. 1) on its side. This sensor comprises a lamina 62 (FIG. 5), one end of which is suspended freely from the frontal side of the common slab 46. On the other end of the lamina 62 there is a stiffly fixed constant magnet 63 on both sides of which, on the common slab 46, there are two contacts 64 controlled by a magnet. These contacts 64 are connected to a computer 9 (FIG. 1) and interact promptly, but in turn, with the constant magnet 63 (FIG. 5). The removable chest and abdomen unit is provided with a sensor 65 for blows to the interscapular region and a sensor 66 for blows to the heart region. Each of said sensors 65,66 comprises a body 67 (FIG. 6) wherein, one under the other, there are freely installed constant magnets 68,69. In the side wall of the body 67, there is a fixed contact 70 controlled by a magnet. Said contact 70 is connected to a computer 9 (FIG. 1) and interacts promptly with the constant magnets 68 and 69 (FIG. 6). The sensor 65 (FIG. 5) is installed stiffly on the internal side of the covering of the trunk 4 unit in the interscapular region and the sensor 66 is installed stiffly on the internal side of the frontal tough panel 50 in the heart region. The removable chest and abdomen unit is also provided with a buckle-model 71 of the waist-belt comprising a body 72 (FIG. 7) fixed on the external side of the frontal tough panel 51 (FIG. 5), which resembles the front surface of a human being's abdomen. Inside the body 72 (FIG. 7), an insert 73 with a built-in light indicator 74 for indicating the "position of the buckle" is installed so as to be capable of movement. In the side walls of the body 72, there are two mechanical contacts 75 and 76. The contact 75 allows restarting of the training program directly from the model 1 (FIG. 1) of a human being, and the contact 76 (FIG. 7) records the state of the buckle-model 71 (FIG. 1) in an "undone" position.

Figure 7:
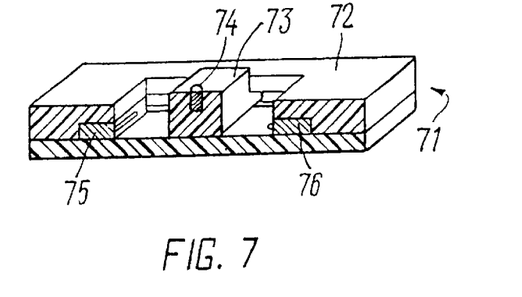
FIG. 7 depicts a construction of the buckle model of the waist-belt according to the present invention.

Said light indicator 74 (FIG. 7) and contacts 75, 76 are all connected to a computer 9 (FIG. 1) and interact promptly, but in turn, with the buckle-model insert 73 (FIG. 7). The upper 5 (FIG. 8) and lower 6 extremities of the model 1 are constructed as hollow units. Said extremities 5 and 6 are made of tough plastic and consist of movably combined parts simulating the humeral, cubital, carpal, femoral and crural portions of a human being's legs and arms. The extremities 5 and 6 are connected to the trunk 4 unit with a help of hinges (they are not shown on the FIG.) wherein, in the appropriate places, there are sensors for putting on immobilized splints and sensors for bending the extremities 5 and 6 at their cubital and femoral joints. Said sensors are connected to a computer 9 (FIG. 1). On the upper extremity 5 (FIG. 8) of the model 1 of a human being there are sensors 77 and 78 for putting on splints. Said sensors 77 and 78 comprise two mechanical contacts fixed stiffly, correspondingly, under holes drilled in the forearm region in the covering of the upper extremities.

The model 1 of a human being also provided with sensors 79 and 80 for putting splints on the lower extremity. Said sensors 79 and 80 comprise two mechanical contacts fixed, correspondingly, under holes drilled in the covering of trunk 4 unit and under holes drilled in the covering of the thigh of the model 1 of a human being. In the cubital and femoral joints model of the extremities 5 and 6 of the model 1 of a human being are sensors installed in the form of constant magnets 81 and 82 as well as sensors installed in the form of contacts 83 and 84, which are controlled by a magnet. Said contacts 83 and 84 are installed opposite said constant magnets 81 and 82 and are connected to a computer 9 (FIG. 1) and interact promptly with their corresponding said constant magnet 81 or 82. In the model 1 (FIG. 8), there is a set of pulse simulators comprising the following: a pulse simulator 85 of the carotid artery, a pulse simulator 86 of the radial artery, and pulse simulator 87 of the humeral artery and a pulse simulator 88 of the femoral artery. Each of said pulse simulators comprises a body 89 (FIG. 3,9) wherein there is an electromagnet 90 connected to a computer 9 (FIG. 1) and a constant magnet 91 (FIG. 3,9) freely installed over said electromagnet 90, but separated from said electromagnet 90 by a damping gasket 92. Said constant magnet 91 is connected stiffly with the base of a rod 93 whose free part is installed movably in holes drilled in the covering of the model 1 (FIG. 8) in places corresponding to medical claims. The electromagnet 90 (FIG. 3, 9) is connected to a computer 9 (FIG. 1). Said constant magnet 91 (FIG. 3, 9) interacts promptly wit the electromagnet 90 and with a student's fingers by means of the rod 93. Said pulse simulators 87 and 88 (FIG. 8) of the humeral and femoral arteries are combined with sensors for pressing the appropriate arteries. For this purpose, the body 89 (FIG. 9) of the appropriate pulse simulator is installed freely in a housing 94. Under said body 89, there is a fixed mechanical contact 95 with one part resting against the bottom of the body 89 of said pulse simulator and another part resting against the housing 94. The contact 95 is connected to a computer 9 (FIG. 1) and interacts promptly with the body 89 (FIG. 9) of said pulse simulator.

Figure 8:
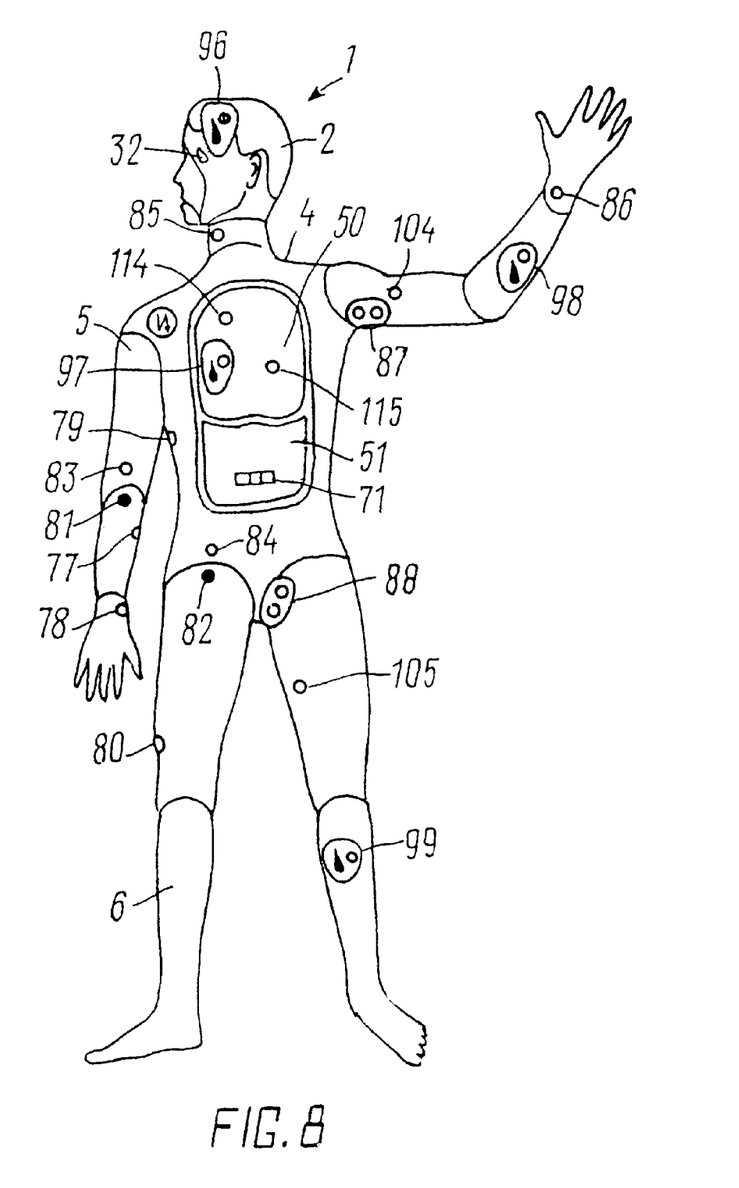
FIG. 8 depicts a model of a human being along with a topography of both the installed simulators for the model's vital activity, and traumas as well as the sensors for detecting external actions according to the present invention.

In the model 1 (FIG. 8) there is a set of video simulators 96, 97, 98 and 99 for simulating external hemorrhaging from penetrating wounds. In the temple region there is a video simulator 97 for external hemorrhaging. In the cubital region there is a video simulator 98 for external hemorrhaging. Each of said video simulators comprises a light filter 100 (FIG. 4) in the form of a blood spot which is installed in the appropriate place under the covering of the model 1 (FIG. 8). Under the filter, there is an illuminating element 101 (FIG. 4) connected to a computer 9 (FIG. 1). Near each video simulator 96, 97, 98 and 99 for simulating external hemorrhaging, there is a mechanical contact 102 (FIG. 4). Directly above said mechanical contact 102, in the covering of the model, there is a hole wherein a rod 103 is installed movably. The mechanical contact 102 is connected to a computer 9 (FIG. 1) and interacts promptly with a student's fingers or with an oppressive bandage by means of said rod 103 (FIG. 4).

The model 1 (FIG. 8) is also provided with sensors 104 and 105 for putting on a haemostatic medical and improvised tourniquet.

The sensors 104 and 105 are installed in places corresponding to medical claims. Said sensor 104 is situated in the upper third area of one of the model's 1 shoulders and said sensor 105 is installed in the middle of one of the model's 1 thighs. Said sensors represent mechanical contacts analogous to those contacts mentioned in the preceding paragraph which interact with a student's fingers or with an oppressive bandage.

The control system for the teaching process is provided with an educational electric defibrillator 106 (FIG. 1), which is connected to a computer 9 and which includes a video simulator 107 of curve electrocardiograms. Said educational electric defibrillator 106 also includes removable electrodes 108 and 109, which comprise a body 110 (FIG. 10) wherein there is a contact 111 controlled by a magnet. Said contact 111 is fixed inside the body 110 on its foundation. Each of the said electrodes 108 and 109 comprises a mechanical contact 112 installed in the handle of the electrode 108, 109. On the external side of the electrode 108, 109 there is a fixed, resiliently formed cushioning 113. The contact 112, controlled by a magnet, of the appropriate electrode interacts promptly with constant magnets 114 and 115 (FIG. 8), which are installed on the internal side of the frontal panel 50 of the chest and abdomen unit, in the heart region. As mentioned above, the control system for the teaching process comprises an anatomical display 7 (FIG. 1) representing a body 116 (FIG. 11) wherein there is a relief panel 117 with compartments 118 which resemble the contours of the vital internal organs of a human being and with compartments 119 for traumas to said vital internal organs. In said compartments 118 and 119 are assembled illuminating elements 120 connected to a computer 9 (FIG. 1). Over said panel 117 (FIG. 1), there is a color slide 121 of different contrasts with a picture 122 of the skeleton of a human being; a picture 123 of the brain of a human being; a picture 124 of the heart of a human being; a picture 125 of the lungs of a human being; a picture 126 of the arterial channel of a human being; a picture 127 of the stomach of a human being; a picture 128 of blood spots in the temporal, cubital and crural regions; pictures 129 of broken extremities and pictures 130 of a spinal column fracture. Said slide 121 is covered from above by a protective screen 131 made of semitransparent material. Under said screen 131, on the relief panel 117, there is an indicator 132 for the time of an emergency aid educational program, which is connected to a computer 9 (FIG. 1). In addition, the anatomical display 7 is provided with illuminating elements 134 (FIG. 11) installed on the relief panel 117 and is also connected to a computer 9 (FIG. 1). The illuminating elements 134 (FIG. 11) simulate electric current passing various ways through a person's body when under tension at the moment of electrotrauma. The model 1 (FIG. 1) of a human being also provided with a simulator 134 for releasing a person from contact with the current-carrying parts of electrical equipment, said simulator 134 is also connected to a computer 9 (FIG. 1).

In the computer 9 (FIG. 2), there is an additionally fixed card 135 of parallel interface which provides the control system for the teaching process with versatile connections of the computer with the model 1 and with the anatomical display 7.

The training device works under operating conditions for the following educational programs:

emergency incidental diagnosis of urgent states of "injured person";

emergency aid in the case of external temporal hemorrhaging;

emergency aid in the case of a penetrating wound to the chest;

emergency aid in the case of external hemorrhaging the vessels of the upper extremities;

emergency aid in the case of intense external hemorrhaging from the vessels of the upper extremities;

emergency aid in the case of external hemorrhaging for the vessels of the lower extremities;

emergency aid in the case of intense external hemorrhaging from the vessels of the lower extremities;

emergency aid in the case of an atresic fracture of the upper extremity;

emergency aid in the case of atresic fracture of the thigh;

emergency aid in the case of atresic fracture of the shin;

emergency freeing of the upper respiratory ducts from an obturation by the root of the tongue;

emergency recovering of heart activity by a blow of the fist to the heart region;

emergency aid in the case of an obturation of the upper respiratory ducts by a foreign body;

emergency aid in the case of an obturation by the root of the tongue and by soft tissues of the stomatopharynx;

freeing the respiratory ducts and internal organs of liquid contents;

freeing the respiratory ducts from an obturation by the root of the tongue in the case of trauma to the cervical part of the spinal column;

recovering heart activity by means of electric shock (electric defibrillation);

pulmonic reanimation;

cardio-pulmono-celebral reanimation;

removal of air from the stomach;

emergency aid in the case of an electrical current affection.

The model 1 (FIG. 1) of a human being is provided with a set of interchangeable devices 10 for protecting students against cross-contamination. When changing students, another device 10 for protecting students against cross-contamination, which has been preprocessed by disinfecting solution, is inserted. Said device 10 provides a 100% guarantee of students' protection when performing artificial respiration techniques on the model 1 as the device 10 for protecting students against cross-contamination is the only unit in the model 1 of a human being which comes in contact with a student's mouth. Disinfecting procedure for the device 10 does not interrupt the teaching process and takes a minimum amount of time. Hereafter, work with the training device is described through the examples of some emergency aid training programs.

The model 1 of a human being, the anatomical display 7 and the educational electric defibrillator 106 are connected to a computer 9 (FIG. 1) with the help of electric cables.

With the help of the keyboard of the computer 9, the basic panel (it is not displayed on the FIG.) menu for teaching said programs is displayed on the monitor's screen. By manipulating the computer 9, instructors start, for example, the program "Emergency freeing of the upper respiratory ducts from an obturation by the root of the tongue". Respective signals from the computer 9 (FIG. 1) go into the model 1 of a human being, the anatomical display 7 and the electric defibrillator 106. Current impulses with the respiration rate for a human being go to the electromagnet 53 (FIG. 5). The constant magnet 52 interacts with the electromagnet 53 and as a result, the frontal panel 50 of the chest unit of the trunk 4 unit of the model 1 (FIG. 1) of a human being produces "respiratory" excursions.

Figures 9, 10, 11:
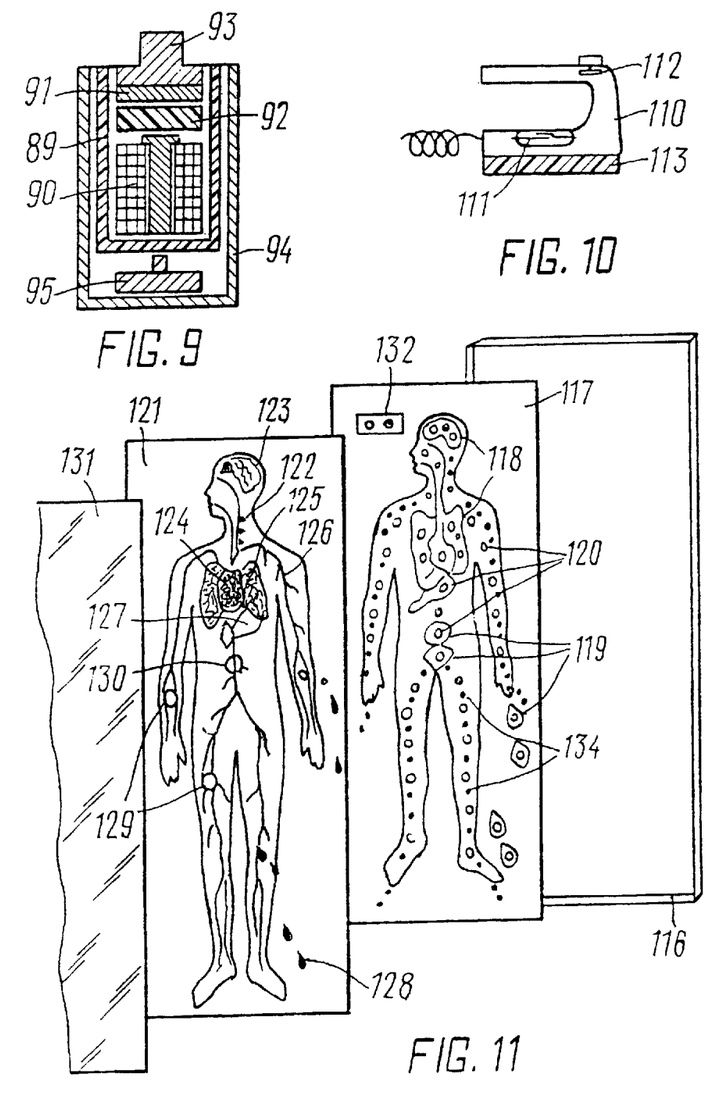
FIG. 9 depicts a construction of the pulse simulator combined with a sensor for detecting when an artery is pressed according to the present invention.
FIG. 10 depicts a removable electrode of the electric defibrillator according to the present invention.
FIG. 11 depicts a construction of the anatomical display according to the present invention.

The current impulses with the pulse rate for a human being go to the electromagnet 90 (FIG. 3) of the pulse simulator 85 of the carotid artery and to the respective electromagnets of pulse simulators 86,87,88 (FIG. 8) of the model 1 of a human being. The electromagnet 90 influences the constant magnet 91 and the rod 93, through the damping gasket 92 (FIG. 3), with the same pulse rate. As a result, the vital functions of a living person are simulated in the model 1 (FIG. 1). A student sees on the model 1 both the excursions of the chest's front side, and the narrow pupils of the eye simulators 32. By touching the rod 93 with his fingers, a student feels a "heartbeat". At the same time, various impulses go to the illuminating elements 120 (FIG. 11) installed in the compartments 118 of the anatomical display 7 of the various video simulators of the internal organs of a human being and onto the indicator 132, displaying a set time limit. As a consequence, a student sees the following pictures on the anatomical display 7 (FIG. 1): a contracting heart, lungs filling with air, a pulsing arterial cerebral blood flow and unobstructed upper respiratory ducts. Indicator 132 counts down time. Thus, a student can on the model 1 not only see and feel the vital anatomical signs of a living constitution, but can also observe normal vital activity of a human being's internal organs on the display 7. This "pulse of life" is simulated on the training device in the beginning of all teaching programs without exception. Next, simulation begins of the symptoms corresponding to a person's state in which the upper respiratory ducts are blocked as a result of a trauma. On the model 1 (FIG. 8), the above mentioned simulators are de-energized and the illuminating element 38 (FIG. 3) of the eye simulators 32 goes out. The opaque light filter 37 is invisible against the light filter 36, simulating a wide pupil. The heartbeat and frontal panel's 50 (FIG. 8) respiratory excursions stop on the model 1 (FIG. 1) of a human being and the pupils of eye simulators 32 become wide. The corresponding illuminating elements 120 are de-energized on the display 7 (FIG. 11), but part of them is still under current. Simultaneously, with a signal from the computer's hummer 9 (FIG. 1), control of a chosen program is established in the indicator 132 and said program's time limit begins to countdown. On the model 1 of a human being and on the anatomical display 7, a student relieves symptoms typical of a human being's clinical death. The "pause of clinical death" on the training device is simulated during the time limit of the program. Some illuminating elements 120 (FIG. 11) installed in the compartment 118, which correspond to a simulator of the brain, are still under current for this time period. A student can see a picture of the trachea obstructed by the root of the tongue on the anatomical display 7 (FIG. 1). Despite the absence of arterial blood flow, a part of the simulator of the brain is rose-colored. It helps a student to have a deeper understanding of human anatomical pathophysiology. Students learn that in the "pause of clinical death", in a human being's brain, irreversible processes have not yet happened and a person can still be saved if one begins to carry out emergency techniques. A student puts his palm under the neck 3 unit of the model 1 of a human being, another palm on the forehead of the head 2 unit, and then said student throws back the head 2 unit of the model 1 of a human being. The chin region of the head 2 unit will be displaced to its upper edge along the front wall of the cylinder 39 (FIG. 3) of the neck 3 unit. The sensor for turning over the head 2 unit will operate as the contact 42 controlled by a magnet approaches the constant magnet 41. The signal from the contact 42 controlled by a magnet travels into the computer 9 (FIG. 2) wherefrom the proper signals go into the model 1 of a human being and into the anatomical display 7. As a result, the "pulse of life", described above, will be restored in the training device. A student checks the effectiveness of his action by observing and controlling the vital signs on the model 1 (FIG. 1) of a human being and on the anatomical display 7. The mistakes of the program are if the head 2 unit is not turned over or is not fully turned over, or if the technique is performed beyond the time limit of the program. In both cases, the sign of biological death are simulated on the training device. The proper illuminating elements 120 are de-energized in the compartment 118 (FIG. 11). The picture of the brain becomes gray on the anatomical display 7 (FIG. 1). Furthermore, the picture of the trachea obstructed by the root of the tongue is still on the display 7. All subsequent attempts to "reanimate" the model 1 of a human being will be ineffective as the computer 9 blocks the phases of "reanimation". The technique shows that about 20% of people injured in extreme situations can be saved through a well-timed and correctly administered overturning of the head of said injured person.

Hereafter, instructors choose, for instance, the program "Cardio-pulmono-celebral reanimation".

In the above mentioned program, the training device begins simulating "clinical death". In this case, turning over the head 2 (FIG. 1) unit of the model of a human being does not produce a signal of "reanimation" from the computer 9. Once the student has turned over the head 2 unit quickly and correctly and the upper respiratory ducts appear free on the anatomical display 7, a student begins carrying out artificial respiration and external heart massage. According to the medical instruction, he carries out five cardiac compressions after one inflation. This ratio must be maintained during the entire time limit for the program. Turning over the head 2 unit (FIG. 3) as described in the previous program, frees the upper respiratory ducts. The student holds the head 2 unit (FIG. 3) of the model 1 of a human being in an overturned position and sees how the movable part 12 (FIG. 3) of the mask that simulates the lower lip is moving forward due to the operation of the contact 42 controlled by a magnet. From the computer 9 (FIG. 2), the current impulse will pass to the winding of the electromagnet 29 (FIG. 3,4). The constant magnet 30 will push away from the electromagnet 29 and the movable part 12 of the mask moves forward, staying in this position with the help of the plate 24 and pins 23 moving into the grooves 19, 20 of the immovable part 11 of the mask of the head unit 2. The students shifts the movable part 12 down, opens the hole 17 of the mouth, covers the mouth of the head unit with his mouth and then make a deep exhalation. Air flows into the tube 14 and then exits to the atmosphere outside the model 1 influencing the pintle 25 to overcome the mutual resistance of the constant magnets 26, 27 under the pressure of the exhaled air so as to cause the pintle 25 to shift down. The constant magnet 26 closes the contact 28 controlled by a magnet, whose signal goes to a computer 9 (FIG. 2). Then, the student places his hands on the frontal panel 50 (FIG. 5) of the trunk 4 unit and rhythmically presses down on the frontal panel 50. The panel 50, together with the tough panel 47, will overcome the resistance of the resiliently formed element 49 and will therefore go down. The constant magnet 56 approaches the contact 57 controlled by a magnet whose signal then goes into the computer 9 (FIG. 2). Thus a series of impulses go from the model 1 (FIG. 1) of a human being into the computer 9: one impulse from the sensor for artificial respiration and five impulses from the sensor for external heart massage. The computer 9 will remember the series of impulses and produce return signals to carry out the above mentioned steps for "reanimation" of the training device. If the student's hands are in the wrong position on the panel 50

(FIG. 5), it will move down with distortion. The appropriate mechanical contact 58 will respond and the computer 9 (FIG. 2) will block the steps of "reanimation". The computer will then turn on the hummer and the illuminating element 120 (FIG. 11) installed in the area which corresponds to the place being pressed on by the student on the panel 50 (FIG. 5) of the trunk 2 unit. In the case of excessive effort during the external heart massage, the free end of the tough panel 47 goes down as much as possible and switches on the mechanical contact 61, whose signal goes into the computer 9 (FIG. 2). In response to that, the computer 9 blocks the steps for "reanimation" of the training device, turns the hummer on and sends pulsating current impulses to the group of the appropriate illuminating elements 120 (FIG. 11), which are installed on the relief panel 117 in the region around the heart. As a result, on the model 1 (FIG. 1) of a human being and on the anatomical display 7, the signs of biological death are simulated. Namely, on the model 1 of a human being, there are no excursions of the frontal panel 50 (FIG. 5, nor any pulse on the pulse simulators 85, 86, 87, 88 (FIG. 8). The pupils of the eye simulators 32 are wide. On the anatomical display 7 (FIG. 1), there is a picture of collapsed lungs and a strangulated heart, the brain color is gray, there is no arterial blood flow and a group of the proper illuminating elements are blinking around the heart.

Thus, a student sees on the display 7 where not to position his hands during the heart massage. This allows him to correct his mistakes. In reality, a person who attempts to render help can actually cause harm to internal organs of an injured person by incorrectly positioning his hands during an external heart massage.

Before starting the external heart massage, it is necessary to free an injured person from anything that constrains the movement of the abdomen. On the model 1 (FIG. 1) of a human being a student simulates unfastening a belt buckle. On the buckle-model 71 of the belt, they move the brass 73 (FIG. 7) aside, the mechanical contact 76 responds, and a signal goes into the computer 9 (FIG. 2). The return signals from the computer 9 supply the light indicator 74 (FIG. 7) with tension and release a circuit of the sensor for the external heart massage. If the signal from the sensor for the external heart massage goes into the computer 9 (FIG. 2) when the buckle is not unfastened, the computer 9 blocks the steps for "reanimation", turns the hummer on and sends pulsating current impulses to the light indicator 74 and to the proper illuminating elements 120 (FIG. 11) installed on the relief panel 117 in the abdomen region. The student thus realizes having made a mistake by performing the external heart massage when the model's belt is not unfastened. In reality, a dynamic blow happen in the abdominal cavity of an injured person and damages the liver, which can lead to a fatal outcome.

The program "Emergency help in the case of external temporal hemorrhaging" simulates external hemorrhaging in the case of a head wound on the training device. The pulsating current impulses go from the computer 9 (FIG. 1) to the illuminating element 101 (FIG. 4) of the simulator 96 (FIG. 8) for external hemorrhaging in the head 2 unit of the model 1 of a human being and also to the proper illuminating element 120 (FIG. 11) in the anatomical display. As a result all the signs of a "living" human being, as previously described, are simulated on the model 1 (FIG. 1) of a human being and on the anatomical display 7. The only difference from the previous description is that the rate of the current impulses which go to the pulse simulators 85, 86, 87, and 88 of the model of a human being and to the illuminating elements 120 (FIG. 11), which simulate the arterial blood flow on the anatomical display (FIG. 1), increases several times. As a result, a student sees a pulsating bloody spot in the temporal region of the head 2 (FIG. 8) unit of the model 1 and in the same region on the display 7 (FIG. 1). The student puts an oppressive bandage (it is not shown on the FIG.) on the bloody spot during the time limit set for the program. This bandage influences the mechanical contacts 102 (FIG. 4) through the rod 103. The signal goes from the mechanical contact 102 into the computer 9 (FIG. 2), which disconnects the circuits of said video simulators and restores the rate of the current impulses to the pulse simulators and to the simulators for the arterial blood flow. The pulsating bloody spots disappear from the model 1 (FIG. 1) of a human being and from the anatomical display 7. The pulse rate and the rate of the arterial blood flow are restored to normal. In the case of incorrect actions, i.e., the bandage is put on incorrectly or the time limit of the program runs out, the previously mentioned signs of clinical death are simulated on the training device. Furthermore, the picture of the bloody spots in the temporal region remains on the model 1 of a human being and the anatomical display 7. The student realized he was unable to stop the external hemorrhaging. In reality, this leads to massive hemorrhage and subsequently, to a person's death.

In the program "Emergency recovering of heart activity by a blow of the fist to the heart region", the previously described signs of "clinical death" are simulated on the training device. The student delivers some blows of his fist on the frontal panel 50 (FIG. 5) of the chest unit in the heart region during the time limit set for the program. The sensor 66 responds to these blows. The constant magnets 68 and 69 (FIG. 6), overcoming mutual resistance, displace into the area of contact 70, controlled by a magnet, whose signal goes into the computer 9 (FIG. 2). The computer 9 restores the signs of a "living" human being, as previously described, on the training device. In the case of incorrect actions, i.e., choosing the wrong place to deliver a blow or delivering the blow after the time limit of the program runs out, all typical signs of "clinical death", as previously described, remain on the training device. The simple and effective technique corresponds to medical standards known worldwide including standards established by the European Resuscitation Council. In reality, this technique saves hundreds of lives around the world.

In the program "Emergency aid in the case of an electrical current affection", pictures with specific areas of a person under tension, a condition typically known to occur when dangerous electrical current loops pass through a person are displayed on the monitor's screen of the computer 9 (FIG. 1). Also, pictures of different assistant and special means, with the help of which, a student can release an injured person from contact with the current-carrying parts.

For example, choose the portion of the program where the person's hands touch the instructors heteropolar parts of the electric equipment. After a certain lapse of "life pulse" time, as previously described, the indicator 132 starts to countdown the time limit set for the program and the hummer is heard. In addition, the current impulses go from the computer 9 to the simulator 133 for disconnecting a person from the circuit, located in the model 1 (FIG. 1). In the anatomical display 7 the current impulses go to the illuminating elements 134 (FIG. 11) for the way current passes through a person's body and the current impulses of increased rate go to the appropriate illuminating elements 120 installed in the compartment 118 for the simulator of a person's heart. As a result, a student cannot observe any sign of "life" in the model 1 (FIG. 1) of a human being, he does see the blinking simulator 133. He also sees a picture of a fibrillating heart and a pulsating line passing through the hands and through the heart of a "person" on the anatomical display 7. With the help of the computer's 9 manipulator, a student chooses the means by which he releases the injured person from the current. At this point, the student must take into consideration the type of tension apparent in the situation: up to 1000 volts, which is low tension, or more than 1000 volts, which is high tension. If the students chooses the right means, the computer 9 disconnects the simulator 133 on the model 1 of a human being and also disconnects the illuminating elements 134 (FIG. 11) for the way current passes through a person's body on the anatomical display 7 (FIG. 1). The hummer's sound stops and a student thus knows that the current no longer passes through the injured person. However, there is still no "sign of life" and a picture of a fibrillating heart, typical of electrotrauma from electrical current passing through the heart, appears on the display 7. The injured person can be saved only by electric defibrillation technique.

The student puts the electrodes 108 and 109 of the educational electric defibrillator 196 on the frontal panel 50 (FIG. 8) in the heart region of the trunk 4 unit of the model 1 of a human being and presses said electrodes to said frontal panel 50. The cover plate 113 (FIG. 10) is compressed and the contacts 111 controlled by a magnet will respond to the influence on them by the constant magnets 114 and 115. The signals from said contacts 111 go to the computer 9 (FIG. 1), which switches the video simulator 106 for electrocardiogram curves on and a picture of the proper fibrillational curves will be illuminated on it.

The student makes sure that the heart is fibrillating and then presses the buttons installed in the handles of the body 110 (FIG. 10) of the electrodes 108 and 109 (FIG. 1). In response, the mechanical contacts 112 will respond and the computer 9 will give an order to switch all the previously described simulators for the vital activity of a person on, including the simulator for the heart. At the same time, the computer 9 switches on an additional illumination for depicting the sin-rhythm of an electrocardiogram curve on the video simulator 107 and also switches on a picture of the fibrillational curve.

This program gives students a deeper understanding of the specific features of electrotrauma, develops in them a feeling of healthy fear and vigilance towards electricity and also assists them in mastering the emergency aid techniques to be used for a person injured by current, including lightning stroke. The program also makes the situation maximally close to reality.

INDUSTRIAL APPLICABILITY

The training device provides the quickest way to learn modern scientifically proven emergency aid techniques for an injured person. It allows a great number of people to be taught in the shortest period of time possible while still providing a 100% guarantee of protection against cross-contamination.

The training device is easy to service and does not require any special operating conditions. It can be used by a person of any nationality since there is no linguistic version, by any person over 12, and by a person in any sphere of activity.

The training device gives students the possibility to acquire stable practical skills using a dynamic model, and, at the same time, to acquire knowledge about a human being's anatomy under the influence of negative factors.

The training device can be used widely in schools, in colleges and in higher educational establishments of any type. It is of special interest to people working at the risk to their own lives, including the following: servicemen, fireman, rescue workers, power engineers and also specialists dealing in health and labor protection.

What is claimed is:

1. A training device for teaching emergency aid techniques, comprising:

a human model having a movable head unit, neck unit and body unit connected to each other, said body unit including upper and lower limbs;

vital activity imitators provided inside the human model for simulating inner organ activity;

external sensors provided on the human model for sensing external actions on the inner organs;

an anatomical display provided with a set of videoimitators of the internal organs for simulating traumatic damage to the internal organs;

a computer control unit; and an educational electric defibrillator having electrodes that are connected to the computer control unit and that are adapted to apply electric current;

wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;

wherein the human model is provided with a simulator, connected to the computer control unit and to the external sensors provided on the human model, for imitating a reaction to freeing of the electric current from the human model; and wherein the computer control unit is connected to a mechanical contact installed on a buckle model of a waist-belt provided on the body unit, and wherein the computer control unit is adapted to repeatedly start a teaching program which coordinates operation of the buckle model and an insert provided on the buckle model.

2. The training device according to claim 1, wherein the illuminating elements are installed on a relief panel of the anatomical display along with the set of videoimitators, and wherein the illuminating elements are connected with one another consecutively.

3. The training device according to claim 1, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

4. The training device according to claim 1, wherein said computer control unit provides a program menu including at least 25 anatomical symbols of selectable methods of extreme aid education.

5. A training device for teaching emergency aid techniques, comprising:

a human model having a movable head unit, neck unit and body unit connected to each other, said body unit including upper and lower limbs;

vital activity imitators provided inside the human model for simulating inner organ activity;

external sensors provided on the human model for sensing external actions on the inner organs;

an anatomical display provided with a set of videoimitators of the internal organs for simulating traumatic damage to the internal organs;

a computer control unit; and an educational electric defibrillator having electrodes that are connected to the computer control unit and that are adapted to apply electric current;

wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;

wherein the human model is provided with a simulator, connected to the computer control unit and to the external sensors provided on the human model, for imitating a reaction to freeing of the electric current from the human model; and wherein a constant magnet and a magnet-guided contact are installed in a region of a movable thigh-joint of the lower limbs of the human model for raising said lower limbs, and wherein the magnet-guided contact is connected to the computer control unit and interacts with the constant magnet under control of the computer control unit.

6. The training device according to claim 5, wherein the illuminating elements are installed on a relief panel of the anatomical display along with the set of videoimitators, and wherein the illuminating elements are connected with one another consecutively.

7. The training device according to claim 5, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

8. The training device according to claim 5, wherein said computer control unit provides a program menu including at least 25 anatomical symbols of selectable methods of extreme aid education.

9. A training device for teaching emergency aid techniques, comprising:

a human model having a movable head unit, neck unit and body unit connected to each other, said body unit including upper and lower limbs;

vital activity imitators provided inside the human model for simulating inner organ activity;

external sensors provided on the human model for sensing external actions on the inner organs;

an anatomical display provided with a set of videoimitators of the internal organs for simulating traumatic damage to the internal organs;

a computer control unit; and an educational electric defibrillator having electrodes that are connected to the computer control unit and that are adapted to apply electric current;

wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;

wherein the human model is provided with a simulator, connected to the computer control unit and to the external sensors provided on the human model, for imitating a reaction to freeing of the electric current from the human model;

wherein said external sensors include a sensor of blows to a heart region that is connected to the computer control unit; and wherein the sensor of blows to the heart region comprises a body on which at least two constant magnets are placed freely and at least one magnet-guided contact, and wherein the at least one magnet-guided contact is connected to the computer control unit and interacts with the constant magnets under control of the computer control unit.

10. The training device according to claim 9, wherein the illuminating elements are installed on a relief panel of the anatomical display along with the set of videoimitators, and wherein the illuminating elements are connected with one another consecutively.

11. The training device according to claim 9, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

12. The training device according to claim 9, wherein said computer control unit provides a program menu including at least 25 anatomical symbols of selectable methods of extreme aid education.

13. A training device for teaching emergency aid techniques, comprising:

a human model having a movable head unit, neck unit and body unit connected to each other, said body unit including upper and lower limbs;

vital activity imitators provided inside the human model for simulating inner organ activity;

external sensors provided on the human model for sensing external actions on the inner organs;

an anatomical display provided with a set of videoimitators of the internal organs for simulating traumatic damage to the internal organs;

a computer control unit; and an educational electric defibrillator having electrodes that are connected to the computer control unit and that are adapted to apply electric current;

wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;

wherein the human model is provided with a simulator, connected to the computer control unit and to the external sensors provided on the human model, for imitating a reaction to freeing of the electric current from the human model; and further comprising an imitator of humerous arterial pulse activity and an imitator of thigh arterial pulse activity which are connected to sensors of the humerous artery compression and thigh artery compression, respectively.

14. The training device according to claim 13, wherein the sensors of humerous artery compression and thigh artery compression comprise a housing in which a mechanical contact is fixed and above which there is provided another body, and wherein the mechanical contact is connected to the computer control unit.

15. The training device according to claim 13, wherein the illuminating elements are installed on a relief panel of the anatomical display along with the set of videoimitators, and wherein the illuminating elements are connected with one another consecutively.

16. The training device according to claim 13, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

17. The training device according to claim 13, wherein said computer control unit provides a program menu including at least 25 anatomical symbols of selectable methods of extreme aid education.

18. A training device for teaching emergency aid techniques, comprising:
    a human model having a movable head unit, neck unit and body unit connected to each other, said body unit including upper and lower limbs;
    vital activity imitators provided inside the human model for simulating inner organ activity;
    external sensors provided on the human model for sensing external actions on the inner organs;
    an anatomical display provided with a set of videoimitators of the internal organs for simulating traumatic damage to the internal organs;
    a computer control unit; and
    an educational electric defibrillator having electrodes that are connected to the computer control unit and that are adapted to apply electric current;
    wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;
    wherein the human model is provided with a simulator, connected to the computer control unit and to the external sensors provided on the human model, for imitating a reaction to freeing of the electric current from the human model; and
    further comprising sensors of humerous artery compression and thigh artery compression, wherein the sensors of humerous artery compression and thigh artery compression comprise a housing in which a mechanical contact is fixed and above which there is provided another body, and wherein the mechanical contact is connected to the computer control unit.

19. The training device according to claim 18, wherein the illuminating elements are installed on a relief panel of the anatomical display along with the set of videoimitators, and wherein the illuminating elements are connected with one another consecutively.

20. The training device according to claim 18, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

21. The training device according to claim 18, wherein said computer control unit provides a program menu including at least 25 anatomical symbols of selectable methods of extreme aid education.

22. A training device for teaching emergency aid techniques, comprising:
    a human model having a movable head unit, neck unit and body unit connected to each other, said body unit including upper and lower limbs;
    vital activity imitators provided inside the human model for simulating inner organ activity;
    external sensors provided on the human model for sensing external actions on the inner organs;
    an anatomical display provided with a set of videoimitators of the internal organs for simulating traumatic damage to the internal organs;
    a computer control unit; and
    an educational electric defibrillator having electrodes that are connected to the computer control unit and that are adapted to apply electric current;
    wherein the anatomical display is provided with illuminating elements, connected to the computer control unit and to the external sensors provided on the human model, for imitating how the electric current passes through the internal organs when the electrodes of the educational electric defibrillator are operated to apply the electric current to the human model;
    wherein the human model is provided with a simulator, connected to the computer control unit and to the external sensors provided on the human model, for imitating a reaction to freeing of the electric current from the human model; and
    wherein:
        the external sensors comprise sensors of putting on immobilized splints and tight bandages, sensors of exterior bleeding, and sensors of putting on styptic rope,
        each of said sensors contains at least one mechanical contact above which respective bodies are positioned,
        at positions of installation of the sensors there are holes in which respective movable rods are inserted, and
        said rods interact promptly with respective mechanical contacts and any of the immobilized splints or the tight bandages or the styptic rope.

23. The training device according to claim 22, wherein the illuminating elements are installed on a relief panel of the anatomical display along with the set of videoimitators, and wherein the illuminating elements are connected with one another consecutively.

24. The training device according to claim 22, wherein the simulator for imitating a reaction to freeing of the electric current from the human model comprises a mechanical contact and a light indicator installed on an external surface of the human model in a region of an anterior surface of the body unit, and wherein said simulator interacts promptly with a student's hands.

25. The training device according to claim 22, wherein said computer control unit provides a program menu including at least 25 anatomical symbols of selectable methods of extreme aid education.

* * * * *